United States Patent
Kim et al.

(10) Patent No.: US 8,473,464 B2
(45) Date of Patent: Jun. 25, 2013

(54) METHOD AND DEVICE FOR DATA RECOVERY USING BIT LOGGING

(75) Inventors: Young-seok Kim, Yongin-si (KR);
Hee-gyu Jin, Suwon-si (KR);
Kyoung-gu Woo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 474 days.

(21) Appl. No.: 12/567,591

(22) Filed: Sep. 25, 2009

(65) Prior Publication Data

US 2010/0198794 A1 Aug. 5, 2010

(30) Foreign Application Priority Data

Jan. 30, 2009 (KR) .................. 10-2009-0007475

(51) Int. Cl.
*G06F 17/30* (2006.01)
(52) U.S. Cl.
USPC .................................... 707/648; 707/644
(58) Field of Classification Search
USPC ............... 707/644, 348, 648; 711/147, 153, 711/173; 717/124–135, 149; 718/1, 100, 718/102, 107
See application file for complete search history.

(56) References Cited

U.S. PATENT DOCUMENTS

| 6,834,275 | B2 | 12/2004 | Kanai et al. | |
| 7,065,537 | B2 | 6/2006 | Cha et al. | |
| 7,349,927 | B2 | 3/2008 | Kanai et al. | |
| 7,395,378 | B1 * | 7/2008 | Pendharkar et al. | 711/144 |
| 2002/0116404 | A1 * | 8/2002 | Cha et al. | 707/202 |
| 2008/0120349 | A1 | 5/2008 | Kim et al. | |

FOREIGN PATENT DOCUMENTS

| KR | 20010050644 | 6/2001 |
| KR | 20010050667 | 6/2001 |
| KR | 20010112529 | 12/2001 |
| KR | 1020050112632 | 12/2005 |
| KR | 10-2008-0044480 | 5/2008 |

OTHER PUBLICATIONS

Jagadish et al., "Dali: A High Performance Main Memory Storage Manager," 1994, Proceedings of the 20th VLDB Conference.*

* cited by examiner

*Primary Examiner* — Charles Kim
*Assistant Examiner* — Grace Park
(74) *Attorney, Agent, or Firm* — NSIP Law

(57) ABSTRACT

A method and apparatus for data recovery in a multitasking or multithreading environment is provided. The method includes creating a log record by performing bit-by-bit logging with respect to a lowest level bitmap of a multilevel bitmap, recovering the lowest level bitmap using the log record, and correcting a higher level bitmap corresponding to the lowest level bitmap based on the recovered lowest level bitmap.

17 Claims, 9 Drawing Sheets

| State<br>Image | before image | after image |
|---|---|---|
| Data Image | 1011 0101 | 1011 0001 |
| Log Image | 0000 0100 | 1111 1011 |

| log image<br>Bitmap Update | before image | after image |
|---|---|---|
| 0 -> 1 | Class0 | Class1 |
| 1 -> 0 | Class1 | Class0 |

FIG.3

| State / Image | before image | after image |
|---|---|---|
| Data Image | 1011 0101 | 1011 0001 |
| Log Image | 0000 0100 | 1111 1011 |

FIG.4

| log image / Bitmap Update | before image | after image |
|---|---|---|
| 0 -> 1 | Class0 | Class1 |
| 1 -> 0 | Class1 | Class0 |

| Class0 | &  (bit and operation) |
| --- | --- |
| Class1 | \|  (bit or operation) |

FIG.7A

|  |  | BImage | | AImage |
|---|---|---|---|---|
|  | Data Image | 0001.0001 | → | 0001.0101 |
|  | Log Image | 1111.1011 | | 0000.0100 |
| Undo | Log_BImage | Data_AImage | | Data_Image |
|  | 1111.1011 & | 0001.0101 | = | 0001.0001 |
| Redo | Log_AImage | Data_AImage | | Data_Image |
|  | 0000.0100 \| | 0001.0101 | = | 0001.0101 |

FIG.7B

|  |  | BImage | | AImage |
|---|---|---|---|---|
|  | Data Image | 0001.0001 | → | 0001.0101 |
|  | Log Image | 1111.1011 | | 0000.0100 |
| Undo | Log_BImage | Data_BImage | | Data_Image |
|  | 1111.1011 & | 0001.0001 | = | 0001.0001 |
| Redo | Log_AImage | Data_BImage | | Data_Image |
|  | 0000.0100 \| | 0001.0001 | = | 0001.0101 |

FIG.7C

|  |  | BImage |  | AImage |  |
|---|---|---|---|---|---|
|  | Data Image | 0001.0101 | → | 0001.0001 |  |
|  | Log Image | 0000.0100 |  | 1111.1011 |  |
| Undo | Log_BImage | Data_AImage |  | Data_Image |  |
|  | 0000.0100 | & 0001.0001 | = | 0001.0101 |  |
| Redo | Log_AImage | Data_AImage |  | Data_Image |  |
|  | 1111.1011 | \| 0001.0001 | = | 0001.0001 |  |

FIG.7D

|  |  | BImage |  | AImage |  |
|---|---|---|---|---|---|
|  | Data Image | 0001.0101 | → | 0001.0001 |  |
|  | Log Image | 0000.0100 |  | 1111.1011 |  |
| Undo | Log_BImage | Data_BImage |  | Data_Image |  |
|  | 0000.0100 | & 0001.0101 | = | 0001.0101 |  |
| Redo | Log_AImage | Data_BImage |  | Data_Image |  |
|  | 1111.1011 | \| 0001.0101 | = | 0001.0001 |  |

FIG.8

Level1 0111 0001 → 1111 0001   ← ③ Logical Logging : Revise
Level2 0000 0000 → 1000 0000   ← ② Logical Logging : Revise
Level3 0000 0000 → 0000 0010   ← ① Physical Logging : Recovery

FIG.9A

[Level1] 1111 1111
[Level2] 1000 0000
[Level3] 0000 0011

FIG.9B

[Level1] 0111 1111
[Level2] 0000 0000
[Level3] 0000 0000

FIG.9C

| L1 | xxx | txn0 | update_bit | page1 | 1 | 36 | 0000.0010 | 1111.1101 |

| L2 | xxx | txn1 | update_bit | page1 | 1 | 36 | 0000.0001 | 1111.1110 |

FIG.9D

[Level1] 0111 1111
[Level2] 0000 0000
[Level3] 0000 0010

FIG.9E

[Level1] 0111 1111
[Level2] 1000 0000
[Level3] 0000 0010

FIG.9F

[Level1] 1111 1111
[Level2] 1000 0000
[Level3] 0000 0010

METHOD AND DEVICE FOR DATA RECOVERY USING BIT LOGGING

CROSS-REFERENCE TO RELATED APPLICATION

This application claims the benefit under 35 U.S.C. §119(a) of a Korean Patent Application No. 10-2009-0007475, filed Jan. 30, 2009, the disclosure of which is incorporated herein by reference in its entirety for all purposes.

BACKGROUND

1. Field

The following description relates to a data recovery technique and, more particularly, to a data recovery technique using bit logging.

2. Description of the Related Art

One of the factors that may affect the performance of a database management system (DBMS) or a file system is recovery management of the DBMS or file system. A log for updated database or file may be recorded to recover from potential system failures.

The DBMS or file system recovery may be based on duplicate information. For example, information contained in a database or a file is stored in duplicate so that the information can be recovered if a system failure occurs. In such a duplicate method that uses a log, when a database or a file is updated, old and new values of the updated data item are separately recorded.

In DBMS or file system recovery, redo or undo operation is typically performed. A redo operation changes a value of an updated data item to a newly updated value. An undo operation changes a value of an updated data item to a value prior to the update.

SUMMARY

In one general aspect, there is provided a data recovery method in a multitasking or multithreading environment, the method including creating a log record by performing bit-by-bit logging with respect to a lowest level bitmap of a multilevel bitmap, recovering the lowest level bitmap using the log record, and correcting a higher level bitmap corresponding to the lowest level bitmap based on the recovered lowest level bitmap.

The recovering of the lowest level bitmap may include employing physical logging based on creation of the log record, and the correcting of the higher level bitmap may include employing logical logging based on recovery of the lowest level bitmap without creating the log record.

When data is updated so that a before log image and an after log image are created, the log record may be configured such that a bit value at an updated position of the log image is different from a bit value at the remaining non-updated positions of the log image.

The creating of the log record may include, if a bit value at a predetermined position of a is data image is updated from 0 to 1 when the data is updated, allocating a bit value of 0 to the updated position and a bit value of 1 to the remaining positions in the before log image of the log record and allocating a bit value of 1 to the updated position and a bit value of 0 to the remaining positions in the after log image of the log record. And if a bit value at a predetermined position of a data image is updated from 1 to 0 when the data is updated, allocating a bit value of 1 to the updated position and a bit value of 0 to the remaining positions in the before log image of the log record and allocating a bit value of 0 to the updated position and a bit value of 1 to the remaining positions in the after log image of the log record.

The before or after log images having a bit value of 0 at the updated position of the log record may be defined as 'class 0,' and the before or after log image having a bit value of 1 at the updated position may be defined as 'class 1.'

The recovering of the lowest level bitmap may include performing an operation on the before log image of the log record and a before or after data image of the log record when performing undo operation to recover the lowest level bitmap, wherein a bit AND operation is performed on the before log image and the before or after data image if the before log image is 'class 0,' and a bit OR operation is performed on the before log image and the before or after data image if the before log image is 'class 1,' and performing an operation on the after log image of the log record and a before or after data image of the log record when performing redo operation to recover the lowest level bitmap, wherein a bit AND operation is performed on the before log image and the before or after data image if the after log image is 'class 0,' and a bit OR operation is performed on the before log image and the before or after data image if the after log image is 'class 1.'

The data image may be determined according to the updated position, and the operation may be performed on the before data image if data at the updated position is the before data image, and performed on the after data image if data at the updated position is the after data image.

The creating of the log record may include creating a log record where a bit value before update corresponding to an updated position is allocated to a first bit of a before log image before update and a value indicating the updated position is allocated to the remaining bits of the before log image before update.

The log record may have a type field indicating a type of the log record which is configured to identify bit-by-bit logging performed on the lowest level bitmap.

The log record may include a before log image before update when data is updated and does not comprise an after log image after update.

The after log image may be obtained by performing a bit negation operation on the before log image.

The data recovery method may further include maintaining de-allocated lowest level bits by a predetermined transaction and reflecting the lowest level bits to the bitmap when the transaction is terminated.

In another general aspect, there is provided a data recovery apparatus in a multitasking or multithreading environment, the apparatus including a controller to create a log record by bit-by-bit logging with respect to a lowest level bitmap of a multilevel bitmap, to recover the lowest level bitmap using the log record, and to correct a higher level bitmap corresponding to the lowest level bitmap based on the recovered lowest level bitmap, and a storage to store the log record created by the controller.

When data is updated so that a before log image and an after log image are created, the log record may be configured such that a bit value at an updated position of the log image is different from a bit value at the remaining non-updated positions of the log image.

The before or after log images having a bit value of 0 at the updated position of the log record may be defined as 'class 0,' and the before or after log image having a bit value of 1 at the updated position may be defined as 'class 1.'

The controller may perform an operation on the before log image of the log record and a before or after data image of the log record when performing undo operation to recover the lowest level bitmap, where a bit AND operation is performed on the before log image and the before or after data image if the before log image is 'class 0,' and a bit OR operation is performed on the before log image and the before or after data image if the before log image is 'class 1,' and the controller may perform an operation on the after log image of the log record and a before or after data image of the log record when performing redo operation to recover the lowest level bitmap, where a bit AND operation is performed on the before log image and the before or after data image if the after log image is 'class 0,' and a bit OR operation is performed on the before log image and the before or after data image if the after log image is 'class 1.'

The data image may be determined according to the updated position, and the operation may be performed on the before data image if data at the updated position is the before data image, and performed on the after data image if data at the updated position is the after data image.

The storage may be a memory, for example, a nonvolatile memory.

Other features and aspects will be apparent from the following description, the drawings, and the claims.

BRIEF DESCRIPTION OF THE DRAWINGS

FIG. 3 illustrates an exemplary log image creation rule of a log record with respect to a lowest level bitmap.

FIG. 4 illustrates an exemplary log image class decision rule of a created log record with respect to a lowest level bitmap.

FIGS. 7A to 7D illustrate exemplary recovery procedures for a lowest level bitmap.

FIG. 8 illustrates exemplary data recovery for a higher level bit map corresponding to a lowest level bitmap.

FIGS. 9A to 9F illustrate exemplary data recovery in a multitasking or multithreading environment.

Throughout the drawings and the detailed description, unless otherwise described, the same drawing reference numbers refer to the same elements, features, and structures. The relative size and depiction of these elements may be exaggerated for clarity, illustration, and convenience.

DETAILED DESCRIPTION

The detailed description is provided to assist the reader in gaining a comprehensive understanding of the methods, apparatuses and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

Figure 1:
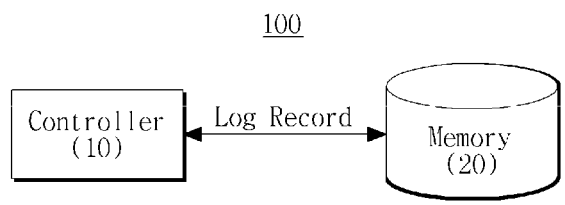
FIG. 1 is a diagram illustrating an exemplary apparatus for data recovery.

FIG. 1 illustrates an exemplary data recovery apparatus 100.

The data recovery apparatus 100 includes a controller 10 and a storage, for example, a memory 20. The controller 10 creates a log record by a process of bit-by-bit logging with respect to a lowest level bitmap of a multilevel bitmap and stores the log record in the memory 20. The lowest level bitmap is recovered using the log record stored in the memory 20 and a higher level bitmap corresponding to the lowest level bitmap is corrected based on the recovered lowest level bitmap. The memory 20 stores the log record created by the controller 10. The memory 20 may be, for example, a nonvolatile memory.

The data recovery apparatus 100 may be applied to a database management system (DBMS) or a file system supporting a transaction feature. As an example, data recovery is performed in a data update operation in a multitasking or multithreading environment. The multitasking refers to a method by which multiple processes share common processing resources such as a CPU in a single operating system. The multithreading refers to a method by which multiple threads existing within the same process can be executed. The term transaction refers to a unit of work performed within a DBMS or similar system against a database and treated in a coherent and reliable way independent of other transactions.

To address an issue such as a race condition due to access to shared resources when multiple processes or multiple threads are simultaneously executed, a technique such as mutual exclusion object (mutex) may be employed to set a critical section so that only one process or thread can access to a resource at a time. This technique may be applied in accessing to a multilevel bitmap according to one exemplary implementation. For example, access to a bitmap is made in order of higher level to lowest level to perform an update operation, so as to guarantee an atomic operation.

The data recovery apparatus 100 performs a bit-by-bit logging to create a log record. In a DBMS or a file system, a log may be recorded for an update when data is updated. The log may be used to recover from an abnormal state of the system. For example, the log may be used to recover from damage, failure, corruption, or inaccessibility when the system abnormally stops from operating. The log data may be created in units of log record and stored in the memory 20.

A data recovery apparatus using a log record may perform byte-by-byte logging to create log data. For example, a typical log record may include a length field in bytes of an updated data, a before image in bytes indicating data prior to updating, and an after image in bytes indicating data following the updating. However, such data recovery through byte-by-byte logging may not be appropriate for a multilevel bitmap. That is, a bitmap may be stored in pages in a disk and include several consecutive pages. A multilevel bitmap refers to a bitmap where a predetermined higher level bit corresponds to a predetermined lower level bit. For example, a higher level bit may correspond to eight lower level bits. In this case, if the higher level bit has a value of 1, at least one of the eight lower level bits has a value of 0. If the higher level bit has a value of 0, all of the eight lower level bits have a value of 0.

In case of a free page, it may be determined that the free page exists if a bit has a value of 1 and the free page does not exist if a bit has a value of 0. Hence, if a higher level bit has a value of 1, a bit of eight lower level bits is allocated a value of 1 and a corresponding page is allocated. It is understood that the number of lower level bits corresponding to the higher level bit may be 8, 16, 32, etc., and the number of levels may be 5, 6, 7, etc.

As described above, a multilevel bitmap has higher level bits and lower level bits which are connected in bits and thus bit-by-bit logging is used. The bit-by-bit logging may be performed in a single processing or thread environment but may not be appropriate for a multiprocessing or multithreading environment. For example, if two transactions perform commit and abort operations, normal recovery may not be completed. In this case, however, according to an exemplary embodiment taught herein, normal recovery may be completed by bit-by-bit logging in a multithreading environment.

Figure 2:
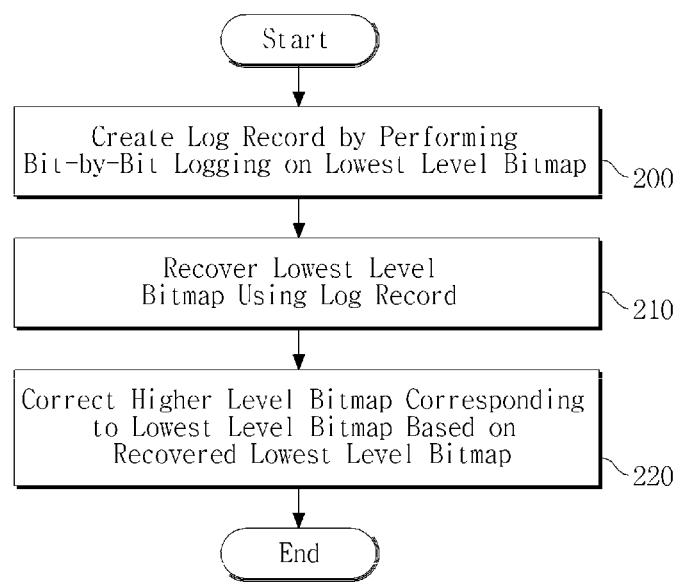
FIG. 2 is a flow chart illustrating an exemplary method for data recovery.

FIG. 2 is a flow chart illustrating an exemplary data recovery method.

Referring to FIG. 2, a log record is created by performing bit-by-bit logging with respect to a lowest level bitmap in operation 200, the lowest level bitmap is recovered using the created log record in operation 210, and a higher level bitmap corresponding to the lowest level bitmap is corrected based on the recovered lowest level bitmap in operation 220.

In operation 200, the log record is created by performing bit-by-bit logging with respect to the lowest level bitmap in order to recover data after a data update operation in a multitasking or multithreading environment.

The creation of log record complies with a log image creation rule of a log record and a class decision rule of a log record. For example, for a before log image, which indicates a log image before update, and an after log image, which indicates a log image after update, a bit value corresponding to an updated position is set to be different from a bit value corresponding to the remaining non-updated position. The log image creation rule of a log record will be described below with reference to FIG. 3.

A before or after log image having a bit value of 0 corresponding to an updated position of the created log record may be defined as 'class 0', and a before or after log image having a bit value of 1 corresponding to an updated position of the created log record may be defined as 'class 1'. The class decision rule of a log record will be described below with reference to FIG. 4.

In operation 210, the lowest level bitmap is recovered using the log record created in operation 200. For example, the lowest level bitmap is recovered by executing undo or redo operation to perform a bit AND operation or a bit OR operation on the before image or after image of the log record and the before image or after image of the data image. The operation decision rule will be described below with reference to FIG. 5.

In operation 220, the higher level bitmap corresponding to the lowest level bitmap is corrected based on the recovery result of the lowest level bitmap in operation 210. The operation 210 may be referred to as physical logging based on the creation of the log record, and operation 200 may be referred to as logical logging based on the recovery of the lowest level bitmap. For example, the creation of a log record by bit logging is made on the lowest level bitmap, but is not made on the higher level bitmap even though updating is performed. Accordingly, logical recovery is performed on the higher level bitmap to correct a bit value using the recovery result of the lowest level.

FIG. 3 illustrates an exemplary log image creation rule of a log record with respect to a lowest level bitmap.

In a prior method, if an update operation occurs, a before image, which indicates an image before update, and an after image, which indicates an image after update, are recorded on a log record. According to an exemplary embodiment as taught herein, a before image and an after image are created according to a log image creation rule and are recorded on a log record.

For example, according to the log image creation rule, a before image and an after image have a bit value of 0 or 1 only at updated positions after update operation. That is, if a bit value of a predetermined position of a data image is updated from 0 to 1 after data update operation, a before log image has a bit value of 0 at an updated bit position and has a bit value of 1 at the remaining bit positions according to the log image creation rule. Furthermore, an after log image of a log record has a bit value of 1 at an updated bit position and has a bit value of 0 at the remaining bit positions.

If a bit value of a predetermined position of a data image is updated from 1 to 0, a before log image has a bit value of 1 at an updated bit position and has a bit value of 0 at the remaining bit positions according to the log image creation rule. Furthermore, an after log image of a log record has a bit value of 0 at an updated bit position and has a bit value of 1 at the remaining bit positions.

As a further illustration, as shown in FIG. 3, the sixth bit of a data image is updated from '1' to '0' in a multilevel bitmap where a high bit corresponds to eight low bits. In this case, a before image of a log record created according to the log image creation rule has a value of 1 at the sixth bit of eight bits and a value of 0 at the remaining bits. Further, an after image of the log record has a value of 0 at the sixth bit and a value of 1 at the remaining bits.

FIG. 4 illustrates an exemplary log image class decision rule of a log record created with respect to the lowest level bitmap.

Referring to FIG. 4, a before or after log image having a bit value of 0 at an updated position of the created log record is defined as 'class 0', and a before or after log image having a bit value of 1 at an updated position of the created log record is defined as 'class 1'. For example, if a predetermined bit value of a bitmap is updated from 0 to 1, a before image of a log record becomes 'class 0' and an after image of the log record becomes 'class 1.' Further, if a predetermined bit value of a bitmap is updated from 1 to 0, a before image becomes 'class 1' and an after image becomes 'class 0.'

Referring to FIG. 4, the sixth bit is updated in a multilevel bitmap where a high bit corresponds to eight low bits. If the sixth bit of eight bits of a log image has a value of 0, the remaining seven bits have a value of 1. In this case, the log image corresponds to 'class 0.' Further, if the sixth bit of eight bits of a log image has a value of 1, the remaining seven bits have a value of 0. In this case, the log image corresponds to 'class 1.'

As described above, a class may be determined according to the class decision rule, and redo and undo operations may be performed according to the determined class. For example, the redo operation is to change a value of an updated data item to a newly updated value, and the undo operation is to change a value of an updated data item to a value prior to the update.

Figures 5, 6A:
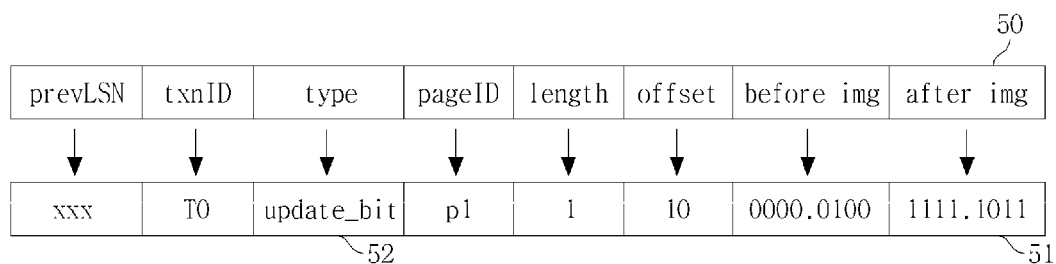
FIG. 5 illustrates an exemplary operation decision rule for a lowest level bitmap recovery.
FIGS. 6A to 6C illustrate examples of created log records with respect to a lowest level bitmap.

FIG. 5 illustrates an exemplary operation decision rule for recovery of a lowest level bitmap.

Referring to FIG. 5, the operation decision rule is to perform bit AND operation or bit OR operation on the log image and data image of the log record created by the log image creation rule described in FIG. 3 according to the class determined by the class decision rule described in FIG. 4. For example, a bit AND operation is performed if a log image is 'class 0,' and a bit OR operation is performed if a log image is 'class 1.' In this case, upon performing the undo operation, a bit AND operation is performed between the before log image of the log record and the before or after data image if the before log image is 'class 0.' Further, a bit OR operation is performed between the before log image of the log record and the before or after data image if the before log image is 'class 1.' Accordingly, the lowest level bitmap is recovered.

On the other hand, upon performing the redo operation, a bit AND operation is performed between the before log image of the log record and the before or after data image if the after log image is 'class 0.' Further, a bit OR operation is performed between the before log image of the log record and the before or after data image if the after log image is 'class 1.' Accordingly, the lowest level bitmap is recovered.

Upon performing the undo or redo operation, the data image which performs an operation with the log image may be a before data image or an after data image. That is, upon performing the undo or redo operation, an operation is performed on a before data image if data at an updated position is a before data image, and an operation is performed on an after data image if data at an updated position is an after data image.

An exemplary recovery process for a lowest level bitmap is described below.

If a log record created according to the log image creation rule is of an update_bit type, it is determined as a log record created by a process of bit logging, and a before log image or an after log image is selected to perform the undo or redo operation. Then, it is determined whether the selected log image belongs to 'class 0 ' or 'class 1.' If it belongs to 'class 0,' a bit AND operation is performed between the log image and the data image. If it belongs to 'class 1,' a bit OR operation is performed between the log image and the data image. After the lowest level bitmap is thus recovered, higher level bits than the lowest level bit are corrected such that higher level bits corresponding to the lowest level bit are consistently maintained based on lower level bit values. Accordingly, even though the undo or redo operation is repeatedly performed, the same result may be obtained as when the undo or redo operation is performed once.

Figure 6B:
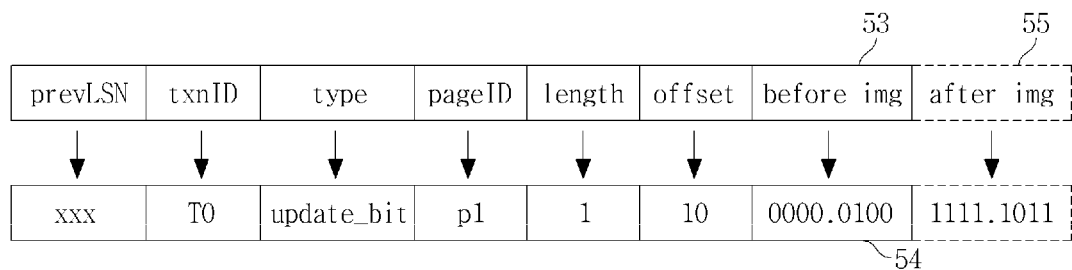
Figure 6C:
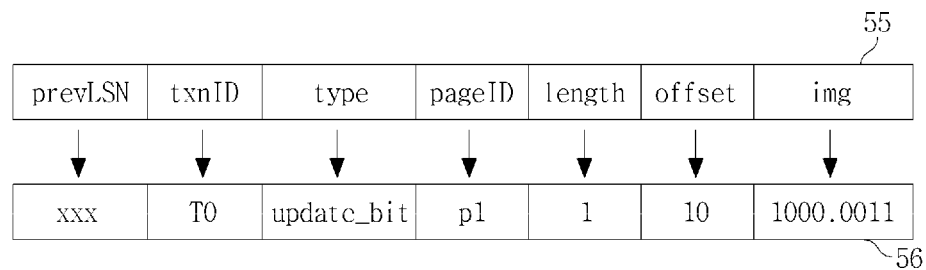

FIGS. 6A to 6C illustrate examples of created log records with respect to a lowest level bitmap.

Referring to FIG. 6A, a log record 50, which is created by bit-by-bit logging with respect to a lowest level bitmap, includes a prevLSN, which is a log sequence number (LSN) of a previous record, a txnID field, which is a transaction identifier, a type field, a page ID field, a length field, an offset field, a before image field, and an after image field.

Reference numeral 51 indicates an example of the log record 50. The type field may be configured to identify bit-by-bit logging with respect to the lowest level bitmap. For example, a log record type 52 may be update_bit instead of update. In this case, when an update_bit type of log record is read, bit logging is performed on the lowest level bitmap.

Referring to FIG. 6B, the log record 53, which is created by bit-by-bit logging with respect to the lowest level bitmap, may include the before log image and not include the after log image. Accordingly, memory is less consumed by the log record 53. As shown in reference numeral 55, the after log image may be acquired by bit negation operation on the before log image. For example, as shown in reference numeral 54, if the before log image is 0000.0100, the after log image becomes 1111.1011 by performing the bit negation operation on the before log image.

Referring to FIG. 6C, the log record 55, which is created by bit-by-by logging with respect to the lowest level bitmap, includes the before image field in which a class of the log image is written on the first bit in the before log image and information about position of an updated bit are written on the remaining bits. For example, if an image is 1000.0011 as shown in reference numeral 56, it is a 'class 1' since the first bit has a value of 1 and the third bit is updated since the remaining seven bits have a value of 3. Accordingly, upon performing undo or redo operation, the before image and the after image may be created using the information recorded on the image.

A transaction typically needs to acquire lock for a shared resource to use the shared resource, and then releases the lock after using the resource. Such a locking mechanism is one of the methods to solve problems created when multiple transactions access shared resources at the same time. Two-phase locking protocol is a method by which lock for a shared resource acquired for a transaction to perform work is released when the transaction ends, such as abort or commit. That is, even though lock for a specific resource is acquired and then work for the resource is completed, the lock for the resource is not released if the transaction continues to proceed.

According to an exemplary embodiment, an atomic operation using mutex for the multilevel bitmap instead of using the locking mechanism may provide the same or similar effect as complying with the two-phase locking protocol. For this, a de-allocated bitmap is maintained for the lowest level of the multilevel bitmap. The de-allocated bitmap is configured such that a predetermined transaction maintains de-allocated lowest level bits and reflects the de-allocated lowest bits to the multilevel bitmap when the transaction is terminated. Hence, the transaction prevents other transactions from using the de-allocated bits until the transaction is terminated without using the locking mechanism. Accordingly, this provides the same or similar effect as complying with the two-phase locking protocol. If the number of bits de-allocated by the transaction is small, it may maintain as a simple array or a linked list and may be updated to a bitmap if the number becomes large.

FIGS. 7A to 7D illustrate exemplary recovery procedures for a lowest level bitmap. FIG. 7A illustrates a recovery procedure for a lowest level bitmap when a predetermined bit is updated from 0 to 1 and a data image is flushed to a storage such as a disk. FIG. 7B illustrates a recovery procedure for a lowest level bitmap when a predetermined bit is updated from 0 to 1 and a data image is not flushed to a storage such as a disk. FIG. 7C illustrates a recovery procedure for a lowest level bitmap when a predetermined bit is updated from 1 to 0 and a data image is flushed to a storage such as a disk. FIG. 7D illustrates a recovery procedure for a lowest level bitmap when a predetermined bit is updated from 1 to 0 and a data image is not flushed to a storage such as a disk.

FIG. 7A illustrates a recovery procedure for a lowest level bitmap when a predetermined bit is updated from 0 to 1 and a data image is flushed to a storage such as a disk. As shown in FIG. 7A, if an initial image of a bitmap, for example, a data image, is 0001.0001 and the sixth bit is updated from 0 to 1, a log image is created such that a before image becomes 1111.1011 which belong to 'class 0' and an after image becomes 0000.0100 which belongs to 'class 1,' according to the log image creation rule in FIG. 3 and the class decision rule in FIG. 4.

Upon performing the undo operation, a bit AND operation is performed on the before log image and the after data image according to the operation decision rule in FIG. 5 since the before log image belongs to 'class 0.' As a result of the undo operation, the data image is recovered to the before data image (0001.0001).

Upon performing the redo operation, a bit OR operation is performed on the after log image and the after data image according to the operation decision rule in FIG. 5 since the after log image belongs to 'class 1.' As a result of the redo operation, the data image is recovered to the after data image (0001.0101). In this case, an identical data image is obtained regardless of how many times the undo and redo operations are performed.

FIG. 7B illustrates a recovery procedure for a lowest level bitmap when a predetermined bit is updated from 0 to 1 and a data image is not flushed to a storage such as a disk. FIG. 7B is the same as FIG. 7A except that the data image is not flushed to a storage such as a disk. In this case, the before data image is used upon performing the undo and redo operations. However, the logging and recovery method is the same as before and a further description will thus be omitted for conciseness.

FIG. 7C illustrates a recovery procedure for a lowest level bitmap when a predetermined bit is updated from 1 to 0 and a data image is flushed to a storage such as a disk. FIG. 7C is the same as FIG. 7A except that a bit of the data image is updated from 1 to 0. The before data image is 0001.0101. In this case, it is assumed that the sixth bit is updated from 1 to 0. In this case, a log image is created such that a before image becomes 0000.0100 which belong to 'class 1' and an after image becomes 1111.1011 which belongs to 'class 0,' according to the log image creation rule in FIG. 3 and the class decision rule in FIG. 4.

Upon performing the undo operation, a bit OR operation is performed on the before log image and the after data image according to the operation decision rule in FIG. 5 since the before log image belongs to 'class 1.' As a result of the undo operation, the data image is recovered to the before data image (0001.0101).

Upon performing the redo operation, a bit AND operation is performed on the after log image and the after data image according to the operation decision rule in FIG. 5 since the after log image belongs to 'class 0.' As a result of the redo operation, the data image is recovered to the after data image (0001.0001).

FIG. 7D illustrates a recovery procedure for a lowest level bitmap when a predetermined bit is updated from 1 to 0 and a data image is not flushed to a storage such as a disk. FIG. 7D is the same as FIG. 7C except that the data image is not flushed to a storage such as a disk upon the recovery. In this case, the before data image is used upon performing the undo and redo operations. However, the logging and recovery method is the same as before and a further description will thus be omitted for conciseness.

FIG. 8 illustrates exemplary data recovery for a higher level bit map corresponding to a lowest level bitmap.

Referring FIG. 8, it is assumed that if a multilevel bitmap is a three-level bitmap where a high bit corresponds to eight low bits, the seventh bit at level 3 is recovered from 0 to 1 by the bit-by-bit recovery (①Physical Logging: Recovery). In this case, the first bit at level 2 corresponds to eight bits at level 3. The bit has a value of 0, which incorrectly reflects information about a lower level since it is a value before correction. In this case, the first bit at level 2 is updated from 0 to 1 (②Logical Logging: Revise). The first bit at level 1 corresponds to eight bits at level 2. The bit has a value of 0, which incorrectly reflects information about level 2 since it is a value before correction. In this case, the first bit at level 1 is updated from 0 to 1 (③Logical Logging: Revise). Accordingly, information about the three-level bitmap may be consistently maintained by recovering the bit at level 3 by the bit-by-bit recovery and performing logical correction of corresponding bits at levels 1 and 2 to reflect the information about the lower levels. While an implementation has been described for the three-level bitmap, it is understood that this is only exemplary and that implementations may be provided for other multi-level bitmaps.

FIGS. 9A to 9F illustrate exemplary data recovery in a multitasking or multithreading environment.

For example, two transactions Txn0 and Txn1 are simultaneously performed in a multitasking or multithreading environment. In this case, it is assumed that Txn0 and Txn1 are created in this order but Txn1 first performs commit operation and Txn0 then performs abort operation.

In an initial state shown in FIG. 9A, Txn0 is created and the seventh bit at level 3 is allocated. In this case, the level 3 bitmap is updated from 0000.0011 to 0000.0001. If Txn1 is then created and the eighth bit at level 3 is allocated, all bits at level 3 become 0. Hence, the first bit at level 2 is also updated from 2 to 0 and all bits at level 2 then become 0. Accordingly, the first bit at level 1 is updated from 2 to 0. As a result, the data image is created as shown in FIG. 9B.

In this process, according to an exemplary data recovery method, a log record is created by performing bit-by-bit logging with respect to the lowest level bitmap. Referring to FIG. 9C, a log record is created only for the lowest level bitmap in each transaction Txn0 and Txn1. The type is set to update_bit to distinguish from a different log record type.

A process where Txn1 performs commit operation and Txn0 then performs abort operation will now be described. A data image at the start of abort operation is the same as the image updated by Txn1 as shown in FIG. 9B. When the abort operation begins, the log record created by Txn0 is read and the type of the log record is determined to be update_bit. Hence, a bit OR operation is performed on the before image of the log record and the data image at level 3 according to the operation decision rule in FIG. 5 since the before image belongs to 'class 1.' As such, the data image is created as shown in FIG. 9D.

If the lowest level bitmap is recovered, a higher level bitmap corresponding to the lowest level bitmap is corrected such that the first bit at level 2 is updated from 0 to 1 as shown in FIG. 9E. Similarly, level 1 is corrected such that the first bit at level 1 is updated from 0 to 1 as shown in FIG. 9F. As a result, the recovery is correctly completed.

Although FIGS. 9A to 9F illustrate a case where a single transaction updates a single bit with respect to the lowest level bitmap, this is only exemplary and that the bit logging and recovery method as taught herein may be applied to a case where two or more bits are updated.

Accordingly to example(s) described above, it may be possible to normally recover data using bit logging in a DBMS or file system in a multitasking or multithreading environment. Furthermore, it may be possible to normally recover data according to a log image creation rule, class decision rule, and operation decision rule.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data recovery method in a multitasking or multithreading environment, the method comprising:
   creating a log record by performing bit-by-bit logging with respect to a lowest level bitmap of a multilevel bitmap;
   recovering the lowest level bitmap using the log record; and
   correcting a higher level bitmap corresponding to the lowest level bitmap based on the recovered lowest level bitmap,
   wherein when a bit value at a predetermined position of a data image is updated so that a before log image and an after log image of the log record is created, the before log image is configured such that a bit value at a position of the before log image that is going to be updated comprises a different bit value than positions of the before log image that are not going to be updated, the after log image is configured such that a bit value at an updated position of the after log image comprises a different bit value than non-updated positions of the after log image, and the after log image is a bit negation of the before log image.

2. The data recovery method of claim 1, wherein the recovering of the lowest level bitmap comprises employing physical logging based on creation of the log record, and the correcting of the higher level bitmap comprises employing logical logging based on recovery of the lowest level bitmap without creating a log record for the higher level bitmap.

3. The data recovery method of claim 1, wherein the creating of the log record comprises:
   if a bit value at a predetermined position of a data image is updated from 0 to 1 when the data is updated, allocating a bit value of 0 to the updated position and a bit value of 1 to the remaining positions in the before log image of the log record and allocating a bit value of 1 to the updated position and a bit value of 0 to the remaining positions in the after log image of the log record; and
   if a bit value at a predetermined position of a data image is updated from 1 to 0 when the data is updated, allocating a bit value of 1 to the updated position and a bit value of 0 to the remaining positions in the before log image of the log record and allocating a bit value of 0 to the updated position and a bit value of 1 to the remaining positions in the after log image of the log record.

4. The data recovery method of claim 1, wherein the before or after log images having a bit value of 0 at the updated position of the log record is defined as 'class 0,' and the before or after log image having a bit value of 1 at the updated position is defined as 'class 1.'

5. The method of claim 4, wherein the recovering of the lowest level bitmap comprises:
   performing an operation on the before log image of the log record and a before or after data image of the log record when performing undo operation to recover the lowest level bitmap,
   wherein a bit AND operation is performed on the before log image and the before or after data image if the before log image is 'class 0,' and a bit OR operation is performed on the before log image and the before or after data image if the before log image is 'class 1,' and
   performing an operation on the after log image of the log record and a before or after data image of the log record when performing redo operation to recover the lowest level bitmap,
   wherein a bit AND operation is performed on the before log image and the before or after data image if the after log image is 'class 0,' and a bit OR operation is performed on the before log image and the before or after data image if the after log image is 'class 1.'

6. The data recovery method of claim 5, wherein the data image is determined according to the updated position, and wherein the operation is performed on the before data image if data at the updated position is the before data image, and the operation is performed on the after data image if data at the updated position is the after data image.

7. The data recovery method of claim 1, wherein the creating of the log record comprises creating a log record where a bit value before update corresponding to an updated position is allocated to a first bit of a before log image before update and a value indicating the updated position is allocated to the remaining bits of the before log image before update.

8. The data recovery method of claim 1, wherein the log record has a type field indicating a type of the log record which is configured to identify bit-by-bit logging performed on the lowest level bitmap.

9. The data recovery method of claim 1, wherein the log record comprises a before log image before update when data is updated and does not comprise an after log image after update.

10. The data recovery method of claim 9, wherein the after log image is obtained by performing a bit negation operation on the before log image.

11. The data recovery method of claim 1, further comprising maintaining de-allocated lowest level bits by a predetermined transaction and reflecting the lowest level bits to the bitmap when the transaction is terminated.

12. A data recovery apparatus in a multitasking or multithreading environment, comprising:
    a controller to create a log record by bit-by-bit logging with respect to a lowest level bitmap of a multilevel bitmap, to recover the lowest level bitmap using the log record, and to correct a higher level bitmap corresponding to the lowest level bitmap based on the recovered lowest level bitmap; and
    a storage to store the log record created by the controller,
    wherein when a bit value at a predetermined position of a data image is updated so that a before log image and an after log image of the log record is created, the before log image is configured such that a bit value at a position of the before log image that is going to be updated comprises a different bit value than positions of the before log image that are not going to be updated, the after log image is configured such that a bit value at an updated position of the after log image comprises a different bit value than non-updated positions of the after log image, and the after log image is a bit negation of the before log image.

13. The data recovery apparatus of claim 12, wherein the before or after log images having a bit value of 0 at the updated position of the log record is defined as 'class 0,' and the before or after log image having a bit value of 1 at the updated position is defined as 'class 1.'

14. The data recovery apparatus of claim 13, wherein the controller performs an operation on the before log image of the log record and a before or after data image of the log record when performing undo operation to recover the lowest level bitmap, where a bit AND operation is performed on the before log image and the before or after data image if the before log image is 'class 0,' and a bit OR operation is performed on the before log image and the before or after data image if the before log image is 'class 1,' and wherein the controller performs an operation on the after log image of the log record and a before or after data image of the log record when performing redo operation to recover the lowest level bitmap, where a bit AND operation is performed on the before log image and the before or after data image if the after log image is 'class 0,' and a bit OR operation is performed on the before log image and the before or after data image if the after log image is 'class 1.'

15. The data recovery apparatus of claim 14, wherein the data image is determined according to the updated position, and wherein the operation is performed on the before data image if data at the updated to position is the before data image, and the operation is performed on the after data image if data at the updated position is the after data image.

16. The data recovery apparatus of claim 12, wherein the storage is a nonvolatile memory.

17. The data recovery apparatus of claim 12, wherein the controller is configured to recover the lowest level bitmap using physical logging based on creation of the log record, and configured to correct the higher level bitmap using logical logging based on recovery of the lowest level bitmap without creating a log record for the higher level bitmap.

* * * * *